Oct. 2, 1945.     A. J. METRO     2,385,874
HEIGHT GAUGE
Filed Jan. 17, 1944
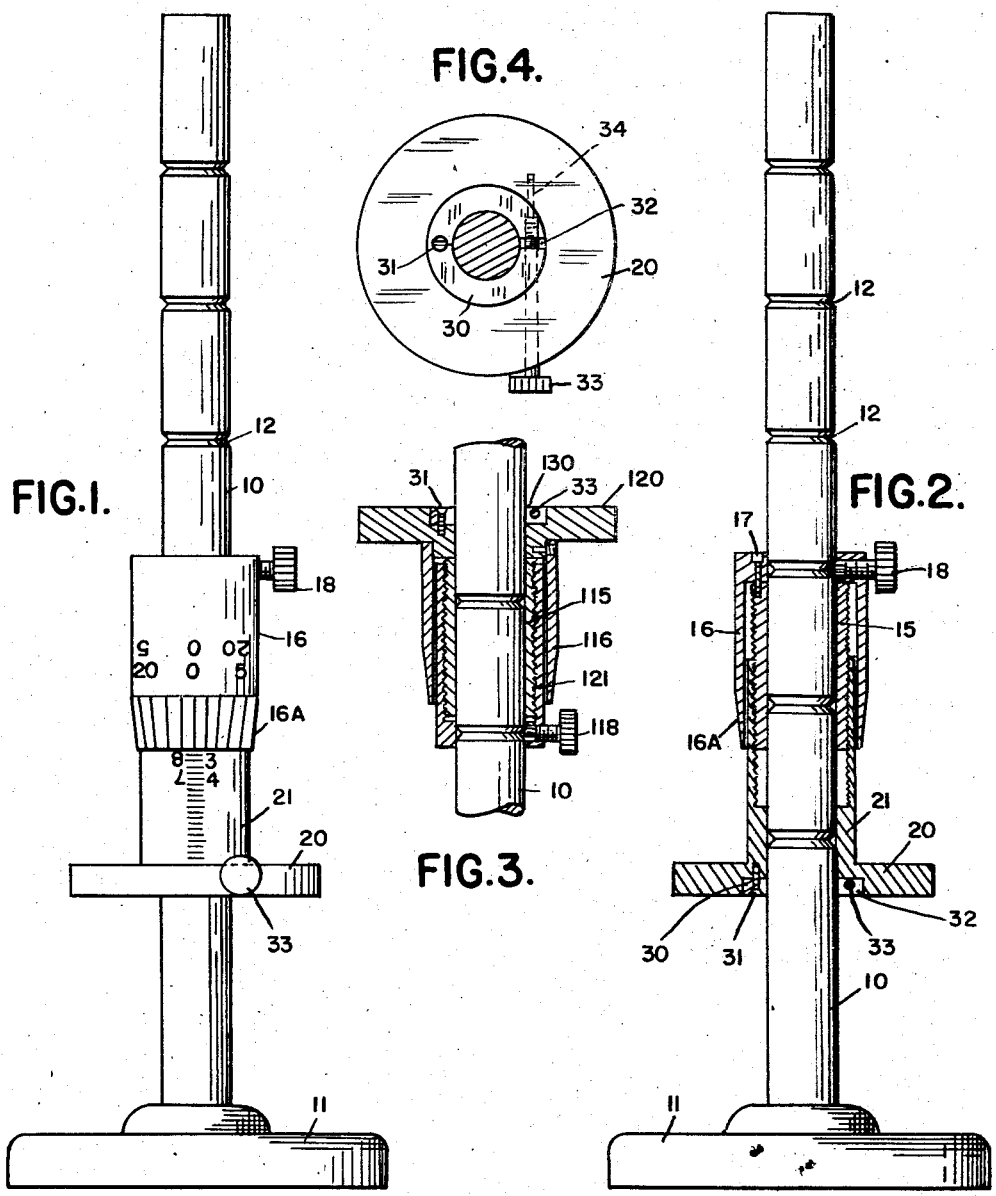
INVENTOR.
ANTHONY J. METRO
BY
ATTORNEYS Patented Oct. 2, 1945

2,385,874

UNITED STATES PATENT OFFICE 2,385,874

HEIGHT GAUGE

Anthony J. Metro, Detroit, Mich.

Application January 17, 1944, Serial No. 518,545

5 Claims. (Cl. 33—170)

The present invention relates to height gauges and has among its objects a height gauge which in itself may be used for accurate measurement.

Another object is a height gauge which may be used in conjunction with measuring blocks, thereby gaining in flexibility of operation over the conventional height gauge.

Still another object is a height gauge which may be made more cheaply than the conventional gauge without sacrificing any of its accuracy.

Other objects and advantages will be apparent to those skilled in the art upon reference to the following description and the accompanying drawing in which Figure 1 is an elevational view of a height gauge constructed according to the present invention.

Figure 2 is a vertical central sectional view of the gauge of Figure 1.

Figure 3 is a view similar to Figure 2 of somewhat modified form of the gauges, and Figure 4 is a plan view of one of the movable plates, showing the locking means.

As indicated in the drawing, the gauge comprises a cylindrical standard 10, preferably hardened and ground, set in a suitable circular base 11, the bottom of which is faced and ground accurately normal to the axis of standard 10. The standard 10 is provided with a number of V-grooves 12, evenly spaced at one inch or other desired distance. If the metric system is to be used, the grooves are, of course, spaced the desired number of centimeters and other proportions arranged accordingly.

Mounted to have a snug sliding fit on the standard 10 is a sleeve 15 threaded on the outside with a conventional micrometer thread. This sleeve 15 is fixed as by screws 17, to a thimble 16, which extends over but is spaced from the sleeve 15, and is provided with a radially inserted thumbscrew 18, this latter being provided with a pointed end adapted to fit into a groove 12 and fix the sleeve 15 and thimble 16 at the desired position on the standard and lock them against rotation.

Also mounted with a snug sliding fit on the standard 10 is a circular plate 20 provided centrally with a sleeve 21 internally threaded and of such thickness as to enter the space between thimble 16 and sleeve 15 and coact with the thread on the latter. On the outer surface of thimble 16 at the lower edge, which is preferably beveled as shown at 16A, are provided vertically arranged graduation lines, the perimeter being equally divided into twenty-five equal spaces as is the practice with micrometers, while the outer surface of sleeve 21 is provided with graduations of short circumferentially arranged lines numbered in groups of four as in micrometers.

It will be noted that the graduations on the thimble 16 and those on sleeve 21 are numbered so as to provide two scales reading on reverse relation. This is to provide for the use of the parts 15, 16, and 20 in either the position shown in Figure 1, or an inverted position.

In producing the gauge, the ports will preferably be so proportioned that, when the sliding assembly is in a position wherein the screw 18 is in the lowest groove 12 and when the sleeve 21 is fully screwed in (to 0), the distance between the top of disc 20 and the bottom of base 11 is an exact unit of distance, say one inch. Also in order to provide the same accuracy in a reversed position, the distance between the axis of screw 18 and the upper surface of thimble 16 must be exactly one-half the thickness of disc 20. When this is done, the exact height of the top of disc 20, when the slider is in any position, may be ascertained by noting the groove 12 being used, and then subtracting the reading at the thimble. If the slider is reversed, the thimble reading must be added.

In order to fix the plate or disc 20 in its accurately adjusted position, clamping or locking means such as is shown in Figure 4 may be provided. In this figure, the disc 20 is shown as provided with a countersunk around its central opening and in this is accurately fitted a split ring 30 held in place by means of a screw 31. Extending in edgewise of the disc 20 through the split portion 32 of the ring 30 is a thumbscrew 33 which passes loosely through the one portion of the ring and is threaded in the other. Further, the screw 33 is preferably provided with a pilot end 34 adapted to extend on into a suitable drilled hole in the disc beyond the ring. Tightening of screw 33, causes the ring 30 to clamp the standard 10 and hold the disc 20 in adjusted position.

In Figure 3 there is shown a modified form of construction in which the inner externally threaded sleeve 115 is a part of or fixed to the disc 120 while the thimble 116 is fixed thereto, there being a suitable space between the thimble 116 and threaded sleeve 115. In this construction, the internally threaded sleeve 121 adapted to enter the space referred to and coact with the threads on sleeve 115, is fixed in adjusted position on standard 10 by a suitable pointed screw 118.

In other respects this form of the device may be the same as that of Figures 1 and 2.

Now having described the invention and the preferred embodiments thereof, it is to be understood that the invention is to be limited, not to the specific details herein set forth, but only by the scope of the claims which follow:

I claim:

1. A height gauge comprising a cylindrical standard, a base therefor having its under surface normal to the axis of said standard, and a slider movable on said standard, said slider consisting of an externally threaded sleeve having a sliding fit on said standard, means for fixing said slider to said standard and against rotation thereon and a plate provided with an opening for the passage of said standard and with an internally threaded sleeve portion adapted to coact with the first mentioned sleeve whereby to elevate or lower said plate.

2. A height gauge comprising a cylindrical standard having a plurality of equally spaced V-grooves, a base therefor having its under surface normal to the axis of said standard, and a slider movable on said standard, said slider consisting of an externally threaded sleeve having a sliding fit on said standard and provided with a pointed screw adapted to coact with one of said V-grooves to fix said sleeve against movement on said standard, and a plate having an opening for the passage of said standard, and an internally threaded sleeve portion around said opening adapted to coact with the externally threaded sleeve to elevate or lower said plate, the latter having its upper and lower surfaces also normal to the axis of said standard.

3. A height gauge comprising a cylindrical standard having a plurality of equally spaced V-grooves, a base therefor having its under surface normal to the axis of said standard, and a slider movable on said standard, said slider consisting of an externally threaded sleeve having a sliding fit on said standard and provided with a pointed screw adapted to coact with one of said V-grooves to fix said sleeve against movement on said standard, a plate having an opening for the passage of said standard, an internally threaded sleeve portion around said opening adapted to coact with the externally threaded sleeve to elevate or lower said plate, the latter having its upper and lower surfaces also normal to the axis of said standard and means for fixing said plate against movement on said standard.

4. A height gauge comprising a cylindrical standard, a base therefor having its under surface normal to the axis of said standard, and a slider movable on said standard, said slider consisting of an externally threaded sleeve having a sliding fit on said standard and a plate having an opening for the passage of said standard and an internally threaded sleeve portion adapted to coact with the first mentioned sleeve, said sleeves being provided with graduations whereby to indicate the relative positions thereof.

5. A height gauge comprising a cylindrical standard having a plurality of equally spaced V-grooves, a base therefor having its under surface normal to the axis of said standard, and a slider movable on said standard, said slider consisting of an externally threaded sleeve having a sliding fit on said standard and provided with a pointed screw adapted to coact with one of said V-grooves to fix said sleeve against movement on said standard, a plate having an opening for the passage of said standard, an internally threaded sleeve portion around said opening adapted to coact with the externally threaded sleeve to elevate or lower said plate, the latter having its upper and lower surfaces also normal to the axis of said standard and means for fixing said plate against movement on said standard, said sleeves being provided with graduations whereby to indicate the relative positions thereof.

ANTHONY J. METRO.